United States Patent Office 2,918,446
Patented Dec. 22, 1959

2,918,446

RUBBER COMPOSITION CONTAINING AROMATIC NITROSO COMPOUND AND DIISOCYANATES AND PROCESS OF VULCANIZING SAME

George E. Serniuk, Roselle, and Francis P. Baldwin, Colonia, N.J., assignors to Esso Research and Engineering Company, a corporation of Delaware No Drawing. Application December 31, 1956
Serial No. 631,462

15 Claims. (Cl. 260—33.6)

This invention relates to vulcanizable and vulcanized rubbery polymeric compositions which are modified copolymers of isoolefins and multiolefins, and to improvements in vulcanizing certain modified butyl rubber copolymers with certain cyano compounds. More particularly, the present invention relates to new and useful rubbery compositions formed by reacting butyl rubber with certain aromatic nitroso compounds followed by vulcanizing the modified butyl rubber formed with aliphatic or aromatic diisocyanates or diisothiocyanates.

The rubbery copolymers of the present invention contain a major portion of isoolefins and a minor portion of multiolefins. These copolymers are commonly referred to in the literature as "butyl rubber" or GR–I rubber (Government Rubber-Isobutylene). For example, it is referred to as "butyl rubber" in "Synthetic Rubber" by G. S. Whitby. The expression "butyl rubber" as employed in the specification and claims is intended to include copolymers having about 85 to 99.5% by weight of an isoolefin which has about 4 to 8 carbon atoms, and about 15 to 0.5% by weight of a conjugated multiolefin having about 4 to 14 carbon atoms.

It has now been discovered that the reaction product of certain aromatic nitroso compounds with unvulcanized butyl rubber may be cured or vulcanized by means of an organic aliphatic or aromatic diisocyanate or diisothiocyanate. It has further been found that the vulcanization reaction takes place either at elevated temperatures or even at room temperature. Since the time required for vulcanization or curing at room temperature varies from a fraction of an hour to several days or more, the compositions are particularly useful for application in cements, containing say about 1 to 10 parts by weight of modified rubbery copolymer in 5 to 50 pts. by weight of inert solvents such as heptane, benzene, naphtha, carbon tetrachloride, etc.

In accordance with the present invention butyl rubber is dissolved in a substantially inert solvent such as a hydrocarbon or chlorinated derivatives of hydrocarbons examples of which are heptane, hexane, benzene, naphtha, mineral spirits, chlorobenzene, carbon tetrachloride, or the like, and reacted at temperatures between about 0° and 200° C., preferably between about 20° and 180° C. with about 0.1 to 10 weight percent and preferably about 0.5 to 5.0 weight percent based on the butyl rubber of an aromatic nitroso compound. The resulting dissolved nitroso modified butyl rubber is then subsequently vulcanized by means of about 0.1 to 20.0 wt. percent, preferably about 0.5 to 5.0 wt. percent, based on the nitroso modified butyl rubber, of organic diisocyanates or diisothiocyanates at temperatures between about 20° and 200° C. preferably between about 50° and 150° or 175° C. for about one minute to 20 days. Alternatively, the nitroso-modified butyl rubber may be stripped of solvents and compounded, per 100 parts by weight of modified rubber, with about 20 to 150 parts by weight of an inert filler such as carbon blacks, clays, or the like, about 0–30 parts by weight of basic metal compounds such as zinc oxide or zinc stearate, about 0–10 parts by weight of sulfur or sulfur-bearing compounds, and about 0.1 to about 3.0 parts by weight of an antioxidant, etc. The compounded modified butyl rubber is then vulcanized at 20° to 200° C. for about one minute to 20 days in the presence of about 0.1 to 10.0 parts by weight, per 100 parts by weight of rubber, of an organic cyano compound in accordance with the present invention.

For the purposes of the present invention, the aromatic nitroso compounds contain a nitroso group directly attached to the aromatic nucleus. These compounds may advantageously also contain at least one other functional substituent having at least one member selected from the group consisting of oxygen, nitrogen and halogen. The last-named functional substituent may also contain at least one non-functional substituent such as alkyl, aryl, aralkyl and/or alkaryl groups. Typical aromatic nitroso compounds falling within the foregoing definitions include among others: nitroso-benzene, p-nitrosophenol, N-substituted-p-nitroso-anilines such as N-nitroso-p-nitroso-$C_1$-$C_5$ alkyl anilines, nitroso toluidines, nitrosobenzaldehydes, nitroso xylidines, nitrosocresols, N,N'-dimethyl-N,N'-dinitroso-benzidine, N,N'-dimethyl-N-nitroso-naphthylamine, etc.

A particularly outstanding group of such materials include those compounds coming within the general formula $$ON—Q—M_mY$$

in which Q is selected from the group consisting of mono and poly nuclear aromatic hydrocarbon or heterocyclic nuclei, M being an aliphatic bivalent hydrocarbon group having a formula selected from the group consisting of $C_nH_{2n}$ and $C_nH_{2n-2}$, n being an integer of between about 1 to 10, m being an integer between about 0 to 10, Y being selected from the group consisting of hydrogen or OR, COOR, X, CN, CHO, $NO_2$, $NR_2$ and

wherein R is hydrogen or a $C_1$ to $C_{24}$ alkyl, aryl, alkaryl, cycloalkyl or aralkyl group and X is halogen (preferably chlorine or bromine).

Typical compounds falling within the above-mentioned formula include: p-nitrosophenol methyl ether, m-nitrosophenyl cyclohexane, p-nitrosobenzyl alcohol, p-nitroso benzoic acid, p-nitrosochlorobenzene, o,p-nitroso dichlorobenzene, p-nitroso cyanobenzene, p-nitroso-nitrobenzene, m-nitroso nitrobenzene, p-nitrosoaniline, p-nitrosodimethylaniline, N-nitroso-p-nitrosomethylaniline, m-nitrosodiethylaniline, N-nitroso-p-nitroso-ethylaniline, N,4-dinitroso-N-hexylaniline, diphenyl nitrosoaniline, methylphenylnitrosoamine, N,N'-dimethyl-4-nitroso-2-methyl-N-nitroso-aniline, N,p-dinitroso-N-ethylaniline, N-nitroso-4-nitrosobenzylamine, N-nitroso-beta-alanine, nitrosopyridines, nitrosoquinolines, N,N'-dinitroso uretidine, etc.

The cyano compounds used during vulcanization, in accordance with the present invention, are aliphatic or aromatic diisocyanates or diisothiocyanates, or materials which under vulcanization conditions form such cyano-compounds in situ. Suitable cyano-compounds include hexamethylene diisocyanate; hexamethylene diisothiocyanate; m- or p-phenylene diisothiocyanates or diisocyanates; diphenyl methane diisothiocyanate, diphenyl methane diisocyanate; 3,3'-bitolylene-4,4'-diisocyanate; 3,3'-bitolylene-4,4'-diisothiocyanate; diphenylmethane-4,4'-diisocyanate; dianisidine diisocyanate; dianisidine diisothiocyanate; 4,4' azobenzene diisocyanate or diisothiocyanate; 4,4'-diphenyl disulfide diisocyanate or diisothiocyanate; 2,4-tolylene diisocyanate or diisothiocyanate or dimerized 2,4-tolylene diisocyanate or diisothiocyanate;

reaction products of isocyanates or isothiocyanates with active hydrogen compounds such as reaction products of diphenyl methane diisothiocyanate or hexamethylene diisocyanate with phenol; reaction products of tolylene diisocyanate with 1,4-butyne diol or 1,4-butene diol; reaction products of 3,3'-bitolylene-4,4'-diisocyanate with caprolactam, diphenylamine, oximes, or phenyl methyl pyrazolone; polyisocyanates or polyisothiocyanates reacted with organic compounds having active methylene groups such as acetyl acetone, acetoacetic acid or ester, nitroethane, cyanoacetic acid, benzoyl acetone, alpha methyl pyridine, fluorene, quinaldine, lepidine, cyclopentadiene, indene, etc.

In order to more fully illustrate the present invention, the following experimental data are given:

Example I

Six samples, each containing 150 grams of butyl rubber, (hereinafter referred to as butyl rubber "A") were reacted with various amounts of nitrosobenzene by forming in each instance a benzene solution of the rubbery copolymer (10 ml. of solvent per gram of copolymer) and charging the resulting solution into a 3-liter 3-way, round bottom flask. The butyl rubber employed had an 8 minute Mooney viscosity at 212° F. of 43, a mole percent unsaturation by the drastic iodine-mercuric acetate method of 2.3, or an iodine number of 13.3 cg./g., a viscosity average molecular weight of 340,000, and corresponded to GR-I-25 rubber. The flask was equipped with a mechanical stirrer, thermometer, reflux condenser, nitrogen inlet tube and water bath. The solution of rubber was stirred and heated to the reflux temperature of benzene or allowed to remain at room temperature (e.g. 25° C.) with stirring for the periods of time indicated in the table given hereinafter.

A 10 weight percent solution of nitrosobenzene dissolved in benzene was then added dropwise in the amounts indicated hereinafter and over periods of time ranging from between about 1¾ hours to 3½ hours. The products were purified by a conventional multiple solution-precipitation technique, using benzene as the solvent and acetone as the anti-solvent. All products were stripped of residual solvent by heating under 24 inches vacuum for 16 hours at 60° C. The products were then analyzed for nitrogen content, the results being as follows:

| Sample | A | B | C | D | E | F |
|---|---|---|---|---|---|---|
| Grams of PhNO added per 150 g. of Polymer | 5.6 | 11.2 | 2.8 | 5.6 | 11.2 | 16.8 |
| Mole Ratio of PhNO to Polymer Double Bonds | 1.0 | 2.0 | 0.5 | 1.0 | 2.0 | 3.0 |
| Temp., °C | 80 | 80 | 25 | 25 | 25 | 25 |
| Time, Hrs | 1.75 | 3.5 | 1.75 | 1.75 | 1.75 | 3.5 |
| Analysis: | | | | | | |
| N, Wt. Percent Found | 0.24 | 0.36 | 0.166 | 0.278 | 0.404 | 0.47 |
| N, Wt. Percent Calc'd | 0.467 | 0.910 | 0.240 | 0.467 | 0.910 | 1.45 |
| N, Wt. of Percent Calc'd | 51.5 | 39.6 | 69.2 | 59.5 | 44.3 | 324 |
| Wt. Percent PhNO in Prod | 1.84 | 2.75 | 1.27 | 2.12 | 3.38 | 3.59 |

The products obtained from runs C, D, E, and F were then cured by adding to 2 g. of each resulting reaction product dissolved in 25 ml. of benzene, 5 drops of hexamethylene diisocyanate. The results were as follows:

| Run | C | D | E | F |
|---|---|---|---|---|
| Days to cure at room temperature | 5 | 6 | 6 | 14 |

The above data show that the reaction product of nitrosobenzene and butyl rubber may be cured (vulcanized) by an organic diisocyanate. It will also be noted that as the proportion of nitrosobenzene in the product increased, the time required to vulcanize or cure the modified butyl rubber also increased. The diisocyanate-containing reaction product in benzene was found to be useful as a cement. An unmodified butyl rubber control did not cure (or vulcanize) with the addition of the organic diisocyanate.

Example II

One hundred grams of butyl rubber "A" were reacted in the same general manner as in Example I with 9.15 g. of p-nitrosodimethylaniline dissolved in 1,000 cc. of xylene. The reaction took place at a temperature level of 139.5° C. for a period of time of 3 hours. The nitroso modified butyl rubber formed was purified by multiple solution-precipitation using chloroform as the solvent and acetone as the anti-solvent. The purified product, upon analysis, showed a nitrogen content of 0.46 which corresponds to a combined p-nitrosodimethylaniline content of 2.47 weight percent. The product was rubbery in nature and dark-colored. This product was compounded with 50 g. of an H.A.F. carbon black known as Philblack "O" and treated with 20 drops of hexamethylenediisocyanate. The stock cured during mixing on the rubber mill at 70° C. in a short time (e.g. 5 min.) to an extremely tough vulcanizate having a tensile strength of 600 p.s.i. and an elongation of 50%. Such a vulcanizate is useful in gaskets and shock absorbers.

Example III

One hundred grams of butyl rubber "A" were reacted in the same general manner as in Example I with 8.25 g. of p-nitrosobenzaldehyde dissolved in 1000 cc. of toluene. Reaction was allowed to ensue for 3 hours at a temperature level of 110° C. The product was purified by multiple solution-precipitation using chloroform as the solvent and acetone as the anti-solvent. Upon analysis, the product showed 0.16 weight percent combined nitrogen which corresponds to 1.54 weight percent of combined nitrosobenzaldehyde. Two grams of this product, dissolved in 25 cc. of benzene, were treated with 5 drops of hexamethylenediisocyanate, the modified rubber being cured in one hour.

Example IV

A solution having a concentration of 10 g. of butyl rubber "A" in 100 cc. of benzene was prepared. 979 grams of this solution were reacted with 1.75 g. of p-nitroso benzoic acid for 2½ hours at the reflux temperature of benzene. The product was purified by multiple solution precipitation using chloroform as the solvent and acetone as the anti-solvent. Analysis of the modified butyl rubber polymer showed 0.056 weight percent nitrogen content. Two grams of this modified reaction product were then dissolved in 25 ml. of benzene and treated with 5 drops of hexamethylene diisocyanate. The modified butyl rubber cured in 16 hours.

Unmodified butyl rubber, when treated with diisocyanates in the manners described in Examples I to IV, did not cure or vulcanize. This shows that nitroso modified butyl rubber is unique compared to unmodified butyl rubber in its ability to effectively cross-link or vulcanize at low temperatures in the presence of organic diisocyanates or diisothiocyanates without the need of other added curatives such as sulfur.

Resort may be had to various modifications and variations of the disclosed embodiments without departing from the spirit of the invention or the scope of the appended claims.

What is claimed is:

1. An improved vulcanizable composition comprising a rubbery copolymer containing about 85–99.5 weight percent of a $C_4$ to $C_8$ isoolefin and about 0.5 to 15.0 weight percent of a $C_4$ to $C_{14}$ multiolefin modified with about 0.1 to 10.0 weight percent based on the copolymer, of an aromatic nitroso compound containing not more than a single nitroso group directly attached to a carbon atom of the aromatic nucleus, and about 0.1 to 20.0 weight percent, based on the nitroso-modified copolymer, of a cyano compound selected from the group consisting of aliphatic diisocyanates, aliphatic diisothiocyanates, aromatic diisocyanates, aromatic diisothiocyanates, and mixtures thereof.

2. A composition according to claim 1 in which the cyano compound is hexamethylene diisocyanate.

3. A rubber cement containing about 1 to 10 parts by weight of the composition of claim 1 and about 5 to 50 parts by weight of an inert solvent.

4. A rubber cement according to claim 3 in which the solvent comprises benzene.

5. An improved vulcanizable composition comprising a rubbery copolymer of isobutylene and isoprene, having about 0.5 to 15 mole percent unsaturation, modified by about 0.1 to 10.0 weight percent of nitrosobenzene, and about 0.1 to 20.0 weight percent, based on the nitrosobenzene-modified copolymer of hexamethylene diisocyanate.

6. A process which comprises reacting a rubbery copolymer containing about 85–99.5 wt. percent of a $C_4$ to $C_8$ isoolefin and about 0.5 to 15.0 wt. percent of a $C_4$ to $C_{14}$ multiolefin with about 0.1 to 10.0 wt. percent based on copolymer of an aromatic nitroso compound containing not more than a single nitroso group directly attached to a carbon atom of the aromatic nucleus and subsequently curing the resulting admixture by means of a composition comprising about 0.1 to 20.0 wt. percent, based on the resulting nitroso modified copolymer, of a cyano compound selected from the group consisting of aliphatic diisocyanates, aliphatic diisothiocyanates, aromatic diisocyanates, aromatic diisothiocyanates, and mixtures thereof, at a temperature level between about 20° and 200° C. until the resulting composition is vulcanized.

7. A vulcanized composition produced in accordance with claim 6.

8. A process according to claim 6 in which the reaction between the nitroso compound and the copolymer is while the copolymer is dissolved in an inert solvent, said solvent being removed prior to vulcanization.

9. A process according to claim 6 in which the reaction between the nitroso compound and the copolymer is at a temperature level between about 0° and 200° C.

10. A process according to claim 6 in which the vulcanization of the nitroso modified copolymer formed is at a temperature level between about 50° and 150° C.

11. A process according to claim 6 in which the cyano compound used during vulcanization is hexamethylene diisocyanate.

12. A process according to claim 6 in which the cyano compound used during vulcanization is p-phenylene diisothiocyanate.

13. A process according to claim 6 in which the cyano compound is a reaction product between phenol and diphenyl methane diisothiocyanate.

14. A process according to claim 6 in which the vulcanization takes place in the presence of about 20 to 150 parts by weight of a carbon black per 100 parts by weight of copolymer.

15. Process which comprises reacting a rubbery copolymer of isobutylene and isoprene having about 0.5 to 15.0 mole percent unsaturation, with about 0.1 to 10.0 weight percent, based on the copolymer, of nitrosobenzene, and subsequently curing the resulting admixture by means of about 0.1 to 20.0 weight percent, based on the resulting nitrosobenzene-modified copolymer, of hexamethylene diisocyanate.

References Cited in the file of this patent

UNITED STATES PATENTS

| | | |
|---|---|---|
| 2,616,876 | Rehner | Nov. 4, 1952 |
| 2,690,780 | Cousins | Oct. 5, 1954 |
| 2,822,342 | Ford | Feb. 4, 1958 |
| 2,826,526 | Meyrick | Mar. 11, 1958 |
| 2,835,624 | Cousins | May 20, 1958 |